(12) United States Patent
Park et al.

(10) Patent No.: US 11,613,270 B2
(45) Date of Patent: Mar. 28, 2023

(54) VEHICLE AND OBSTACLE AVOIDANCE ASSIST METHOD THEREOF

(71) Applicants: HYUNDAI MOTOR COMPANY, Seoul (KR); KIA CORPORATION, Seoul (KR)

(72) Inventors: Joon Young Park, Seoul (KR); Jong Han Oh, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 19 days.

(21) Appl. No.: 17/519,345

(22) Filed: Nov. 4, 2021

(65) Prior Publication Data
US 2022/0144300 A1 May 12, 2022

(30) Foreign Application Priority Data
Nov. 10, 2020 (KR) .......................... 10-2020-0149283

(51) Int. Cl.
*H04N 5/44* (2011.01)
*B60W 50/14* (2020.01)
(Continued)

(52) U.S. Cl.
CPC ............ *B60W 50/14* (2013.01); *B60W 30/09* (2013.01); *B60W 30/0956* (2013.01);
(Continued)

(58) Field of Classification Search
CPC .. B60W 50/14; B60W 30/09; B60W 30/0956; B60W 2050/143; B60W 2050/146; B60W 2520/28; B60W 2540/18; B60W 2554/4041; B60W 2554/802; B60W 2710/202; B60W 2510/1005; B60W 2554/00; B60W 30/08; B60W 30/095; B60W 30/0953; B60W 30/10; B60W 2050/0002; B60W 2552/50; B60W 2710/083; G06V 20/58; G06F 18/214; B60K 7/0007; B60R 21/0134; B60Y 2300/08; B60Y 2300/10
See application file for complete search history.

(56) References Cited

U.S. PATENT DOCUMENTS

| | | | |
|---|---|---|---|
| 7,570,155 B2 * | 8/2009 | Horii ................ | G08B 13/19697 340/988 |
| 2001/0013835 A1 * | 8/2001 | Hsu .......................... | B60Q 1/52 356/3 |

(Continued)

*Primary Examiner* — Munear T Akki
(74) *Attorney, Agent, or Firm* — Lempia Summerfield Katz LLC

(57) ABSTRACT

A vehicle and an obstacle avoidance assist method thereof are capable of performing obstacle avoidance assist control by tracking a previously sensed obstacle that deviates from a sensing region of a sensor. The obstacle avoidance assist method of a vehicle includes: detecting at least one obstacle near a vehicle using a proximity sensor; determining a travel range corresponding to a predicted travel trajectory of the body of the vehicle based on a gear stage and a steering angle; determining at least one effective obstacle, based on the travel range, from the at least one detected obstacle; and outputting a warning about the determined at least one effective obstacle.

18 Claims, 7 Drawing Sheets

(51) Int. Cl.
*B60W 30/095* (2012.01)
*B60W 30/09* (2012.01)
*G06V 20/58* (2022.01)

(52) U.S. Cl.
CPC ........ *G06V 20/58* (2022.01); *B60W 2050/143* (2013.01); *B60W 2050/146* (2013.01); *B60W 2520/28* (2013.01); *B60W 2540/18* (2013.01); *B60W 2554/4041* (2020.02); *B60W 2554/802* (2020.02); *B60W 2710/202* (2013.01)

(56) References Cited

U.S. PATENT DOCUMENTS

| | | | |
|---|---|---|---|
| 2005/0075770 A1* | 4/2005 | Taylor | G08G 1/161 701/1 |
| 2005/0134441 A1* | 6/2005 | Somuah | B60Q 1/535 340/435 |
| 2006/0167595 A1* | 7/2006 | Breed | B60R 21/0152 701/1 |
| 2007/0109104 A1* | 5/2007 | Altan | B60Q 9/008 340/407.1 |
| 2010/0066534 A1* | 3/2010 | Takeichi | G01S 7/527 340/540 |
| 2012/0310547 A1* | 12/2012 | Cristoforo | G01N 33/004 702/24 |
| 2014/0168435 A1* | 6/2014 | Tuhro | B60Q 1/48 348/148 |
| 2014/0207344 A1* | 7/2014 | Ihlenburg | E05F 15/73 701/49 |
| 2015/0070156 A1* | 3/2015 | Milburn, Jr. | B60Q 9/008 340/435 |
| 2015/0073664 A1* | 3/2015 | Petridis | B60W 30/095 701/41 |
| 2020/0101968 A1* | 4/2020 | Kim | B60W 30/0956 |

* cited by examiner

VEHICLE AND OBSTACLE AVOIDANCE ASSIST METHOD THEREOF

This application claims the benefit of and priority to Korean Patent Application No. 10-2020-0149283, filed on Nov. 10, 2020, the entire content of which is hereby incorporated by reference as if fully set forth herein.

BACKGROUND

Field of the Disclosure

The present disclosure relates to a vehicle and an obstacle avoidance assist method thereof. More particularly, the present disclosure relates to a vehicle and an obstacle avoidance assist method thereof capable of performing obstacle avoidance assist control by tracking a previously sensed obstacle that deviates from a sensing region of a sensor.

Discussion of the Related Art

Conventionally, vehicles are equipped with a rear ultrasonic sensor or a rear camera to detect obstacles in the vicinity of the rear of the vehicle. Recently developed vehicles are equipped not only with a front ultrasonic sensor but also with an around view monitor (AVM) system or a surround view monitor (SVM) system for enabling an occupant to check an omnidirectional image in real time.

When the capability to sense a collision with objects around a vehicle is universalized, an increasing number of drivers will come to rely on collision prevention warning sounds and omnidirectional images while parking a vehicle. However, a warning about obstacles near a vehicle only indicates the presence of currently sensed obstacles located within a predetermined sensing region. This is described with reference to FIGS. 1A and 1B.

FIGS. 1A and 1B are diagrams showing an example of a conventional provision of a warning about obstacles near a vehicle.

Referring to FIG. 1A, a plurality of sensors (e.g. ultrasonic sensors) is mounted in a vehicle 10 in order to sense obstacles. The sensors have a sensing region 21 on the front-left side of the vehicle 10, a sensing region 22 straight ahead of the vehicle 10, and a sensing region 23 on the front-right side of the vehicle 10, respectively. When an obstacle is sensed in the sensing region, a visual effect, indicating the sensed obstacle and the corresponding sensing region, is provided through a display disposed in a cluster or the like. At this time, a warning sound is generally provided as well. For example, in the situation shown in FIG. 1A, in which a left obstacle 31 is sensed in the sensing region 21 on the front-left side of the vehicle 10 and a right obstacle 32 is sensed in the sensing region 23 on the front-right side of the vehicle 10, a warning about the left obstacle 31 and a warning about the right obstacle 32 are output together from the vehicle.

When the vehicle is to move forwards in the state in which the front wheels are turned to the left, as shown in FIG. 1A, the vehicle faces the risk of a collision with the left obstacle 31. Thus, a warning about the impending collision needs to be provided. On the other hand, although the right obstacle 32 is also sensed in the sensing region 23 on the front-right side of the vehicle, there is no risk of a collision with the same because the front wheels of the vehicle are turned to the left. Thus, a collision warning does not actually need to be provided. In this case, however, the conventional art outputs a warning about a collision with the right obstacle 32 for the reason that the same is currently located within the sensing region. Thus, such a warning distracts a driver's attention.

As shown in the drawing on the left in FIG. 1B, while the obstacle 31 is sensed in the sensing region 21 on the front-left side of the vehicle 10, a warning about the same is output. However, as shown in the drawing on the right in FIG. 1B, when the obstacle 31 moves out of the sensing region, no warning about the previously sensed obstacle 31 is provided.

SUMMARY

Accordingly, the present disclosure is directed to a vehicle and an obstacle avoidance assist method thereof that substantially obviate one or more problems due to limitations and disadvantages of the related art.

An object of the present disclosure is to provide a vehicle and an obstacle avoidance assist method thereof capable of more effectively providing information about surrounding obstacles to a driver.

However, the objects to be accomplished by the present disclosure are not limited to the above-mentioned objects. Other objects not mentioned herein should be clearly understood by those having ordinary skill in the art from the following description.

In order to accomplish the above and other objects, an obstacle avoidance assist method of a vehicle is provided according to an embodiment of the present disclosure. The method may include detecting at least one obstacle near a vehicle using a proximity sensor. The method may also include determining a travel range corresponding to a predicted travel trajectory of the body of the vehicle based on a gear stage and a steering angle. The method may also include determining at least one effective obstacle, based on the travel range, from the at least one detected obstacle. The method may also include outputting a warning about the determined at least one effective obstacle.

In addition, a vehicle is provided according to an embodiment of the present disclosure. The vehicle may include a proximity sensor, a controller configured to detect at least one obstacle near a vehicle based on information acquired by the proximity sensor and to determine whether to output a warning, and an output unit configured to output a warning under the control of the controller. The controller may determine a travel range corresponding to a predicted travel trajectory of the body of the vehicle based on a gear stage and a steering angle. The controller may also determine at least one effective obstacle, based on the travel range, from the at least one detected obstacle. The controller may also control the output unit to output a warning about the determined at least one effective obstacle.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and serve, together with the description, to explain the principle of the inventive concept. In the drawings.

DETAILED DESCRIPTION

Figure 1A:
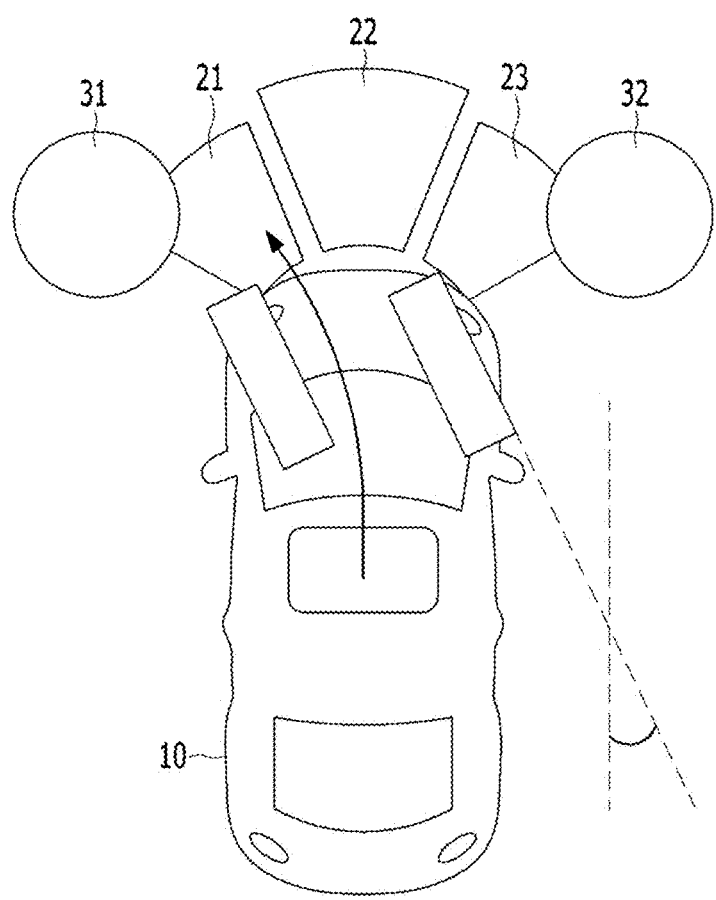
FIGS. 1A and 1B are diagrams showing an example of a conventional provision of a warning about obstacles near a vehicle.
Figure 1B:
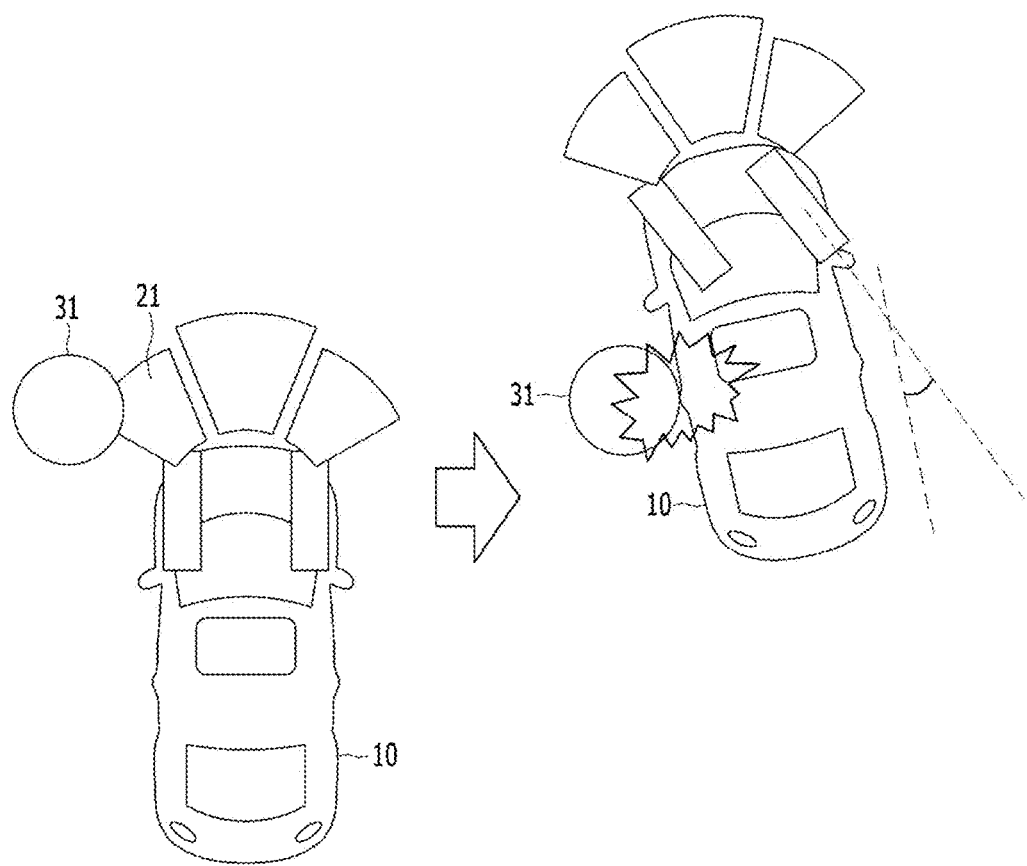

Hereinafter, embodiments of the present disclosure are described in detail with reference to the accompanying drawings so that those having ordinary skill in the art may easily carry out the embodiments. The present inventive concept may, however, be embodied in many different forms and should not be construed as being limited to the embodiments set forth herein. In the drawings, parts irrelevant to the description of the present disclosure have been omitted for clarity. Like reference numerals refer to like elements throughout the specification.

Throughout the specification, when a certain part "includes" or "comprises" a certain component, this indicates that other components are not excluded and may be further included unless otherwise noted. The same reference numerals used throughout the specification refer to the same or equivalent constituent elements. When a component, device, element, or the like of the present disclosure is described as having a purpose or performing an operation, function, or the like, the component, device, or element should be considered herein as being "configured to" meet that purpose or to perform that operation or function.

An embodiment of the present disclosure proposes technology for outputting a warning about an effective obstacle, which is present within a travel range of a vehicle, among at least one obstacle to be tracked and at least one currently sensed obstacle. The warning is determined in consideration of the gear stage and the steering angle of the vehicle.

Figure 2A:
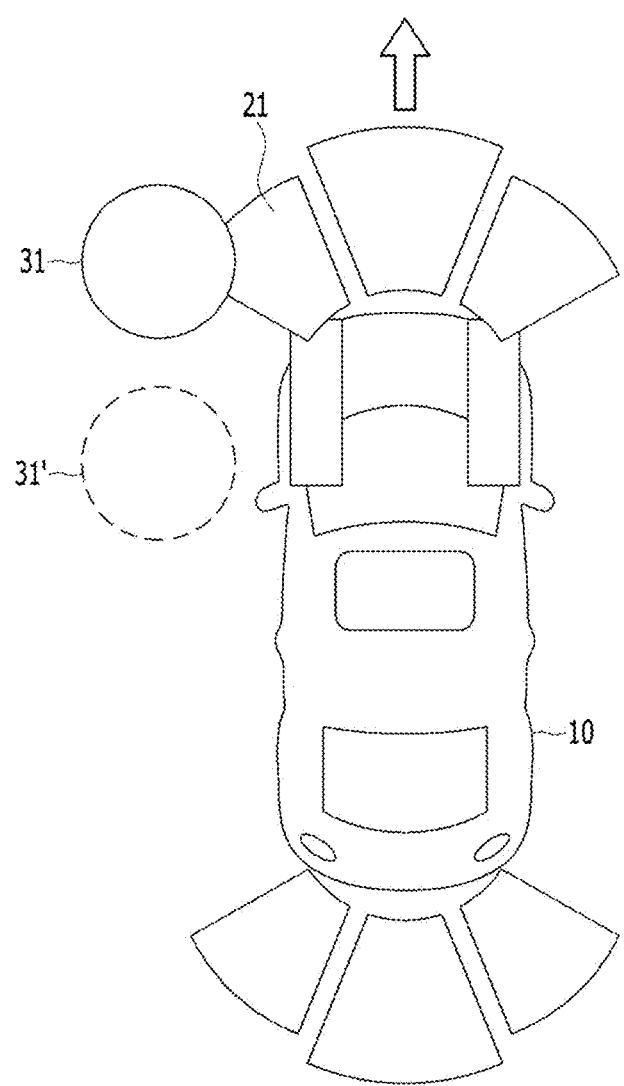
FIGS. 2A, 2B, and 2C are diagrams for explaining the concept of an obstacle avoidance assist method according to an embodiment of the present disclosure.
Figure 2B:
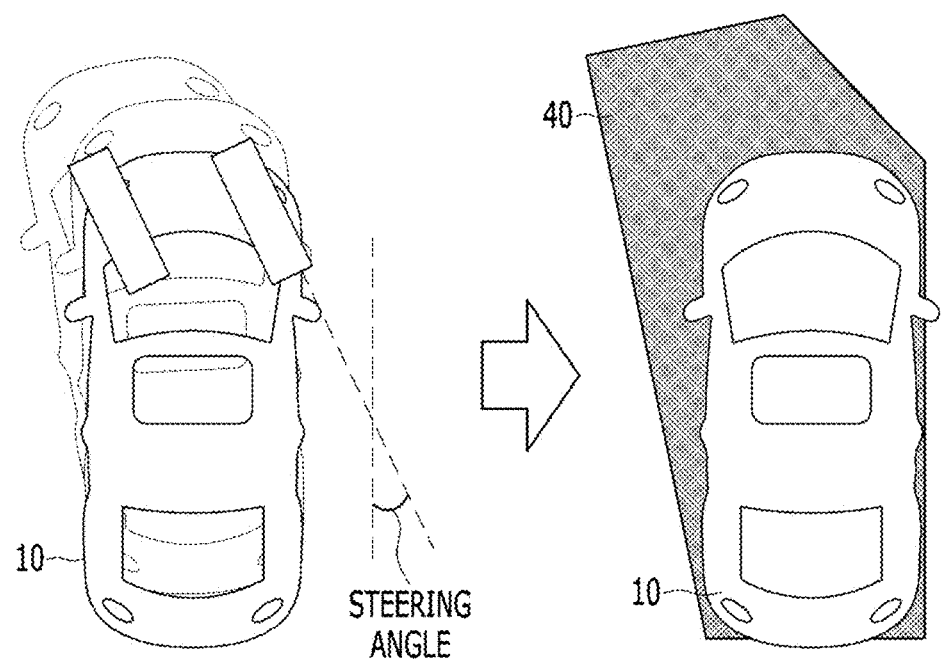
Figure 2C:
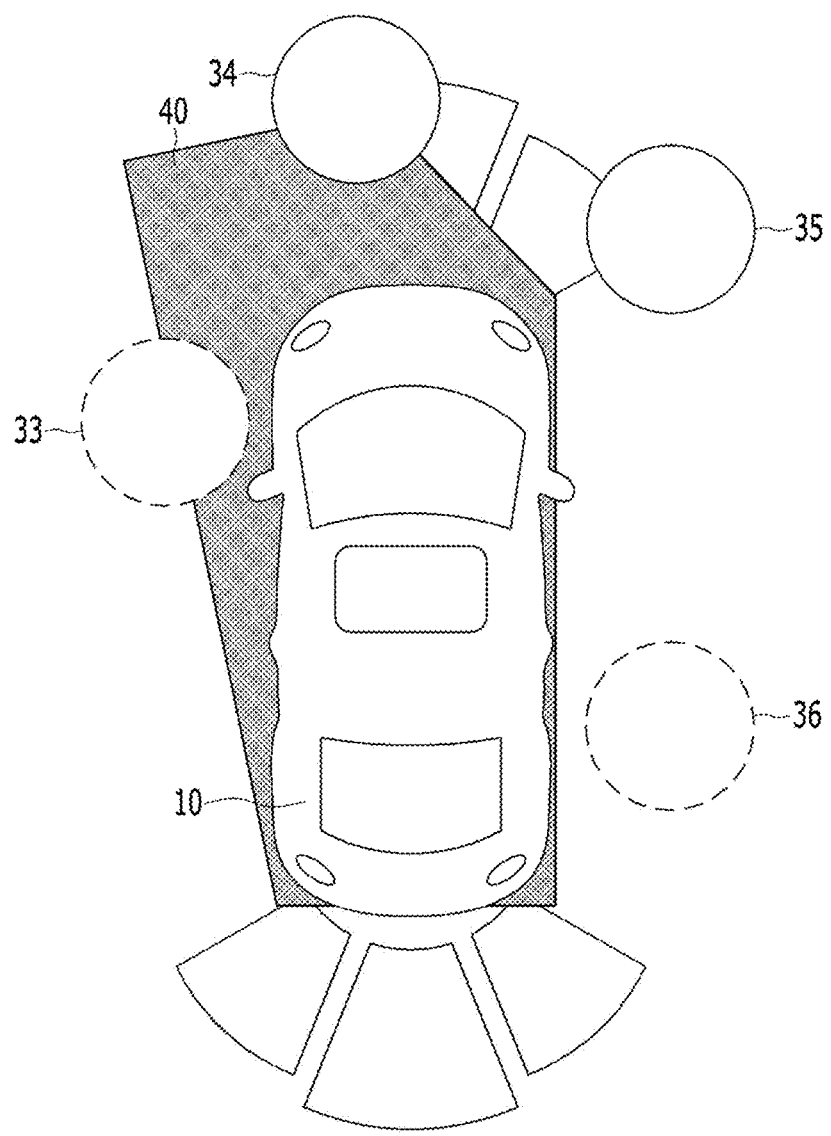

FIGS. 2A, 2B, 2C are diagrams for explaining the concept of an obstacle avoidance assist method according to an embodiment of the present disclosure.

Referring to FIG. 2A, in the case of a general vehicle, when the vehicle moves forwards after an obstacle 31 is sensed in a sensing region 31 on the front-left side of the vehicle, the obstacle 31 deviates from the sensing region 21 and is located at a position 31'. Thus, no more warning pertaining to the obstacle 31 is output from the vehicle.

In order to solve this problem, according to embodiments of the present disclosure, a previously sensed obstacle is managed as an obstacle to be tracked. Here, the obstacle to be tracked is an obstacle, the position of which is tracked by the vehicle regardless of whether the obstacle is currently being sensed until the vehicle moves a predetermined distance or more away from the obstacle after the obstacle is sensed by a sensor.

Next, referring to FIG. 2B, according to embodiments of the present disclosure, the trajectory of the perimeter of the body of the vehicle that is traveling, i.e. a travel range 40, is determined based on the travel direction according to the gear stage (D or R) and the current steering angle of the vehicle. A warning is output about an obstacle present within the determined travel range, among the currently sensed obstacle and the obstacle to be tracked. For example, when the vehicle 10 is steered to the left and thus the travel range 40 shown in the drawing on the right in FIG. 2B is determined, as shown in FIG. 2C, among obstacles 34 and 35, which are currently being sensed by sensors, and previously sensed obstacles 33 and 36, which are set as obstacles to be tracked, a warning may be output only about the obstacles 33 and 34, which are present within the travel range 40 of the vehicle.

Here, the travel range 40 in a lateral direction may be set based on the width of the body of the vehicle 10. The travel range 40 in a longitudinal direction may be set based on the sensing distance of the sensor in the travel direction of the vehicle. However, the above descriptions are given merely by way of example, and the embodiments are not limited thereto.

Hereinafter, the configuration of the vehicle for performing an obstacle avoidance assist method and an obstacle avoidance assist process according to embodiments of the present disclosure are described with reference to FIGS. 3 and 4.

Figure 3:
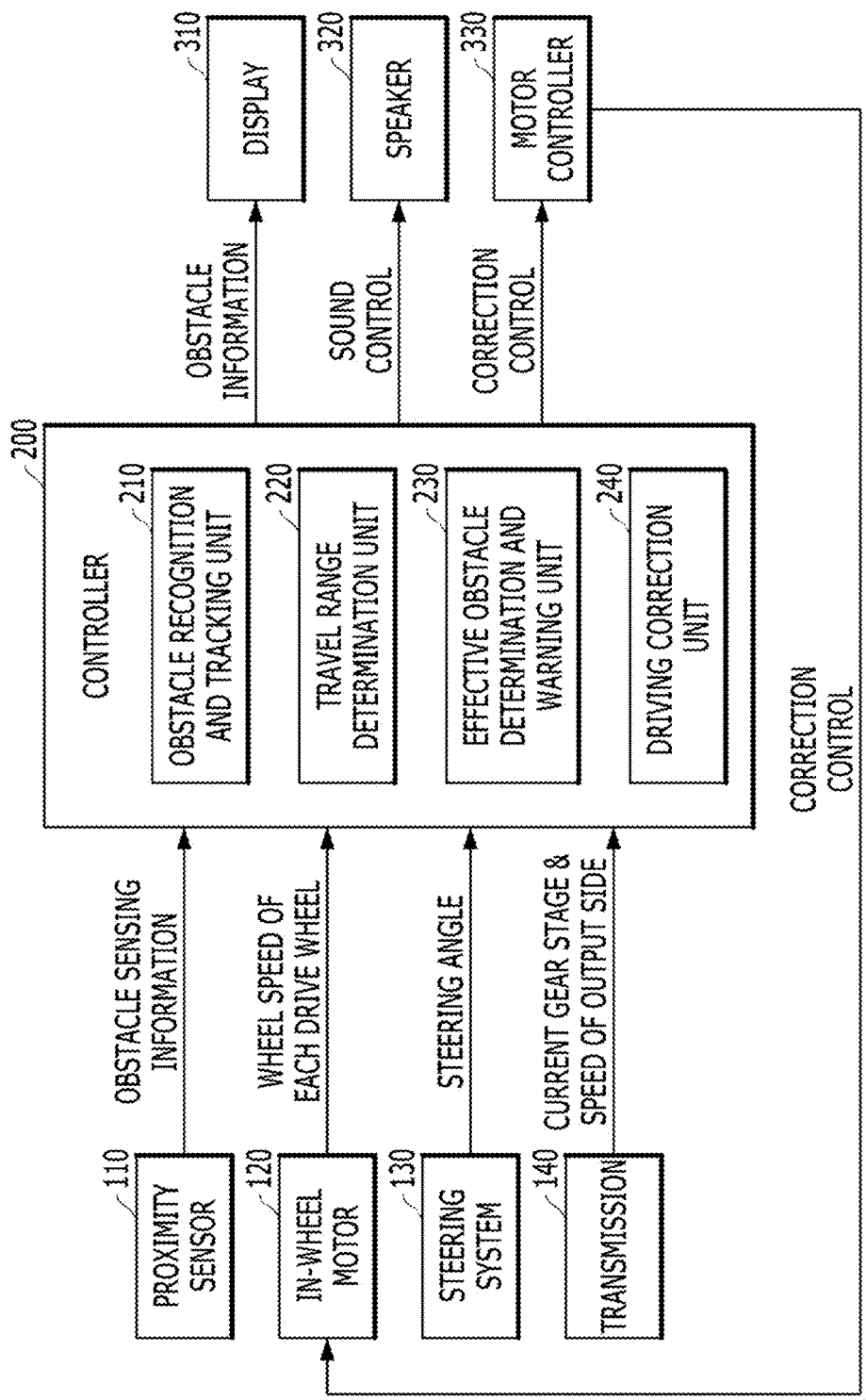
FIG. 3 is a block diagram showing an example of the configuration of a vehicle according to an embodiment of the present disclosure.

FIG. 3 is a block diagram showing an example of the configuration of the vehicle according to an embodiment of the present disclosure.

Referring to FIG. 3, the vehicle according to the embodiment may include information acquisition devices 110, 120, 130, and 140 for acquiring information used to sense and track obstacles in the vicinity of the vehicle. The vehicle may also include a controller 200 for determining whether to output a warning with respect to each obstacle and whether to correct the driving state of the vehicle based on the information acquired through the information acquisition devices 110, 120, 130, and 140. The vehicle may also include controlled devices 310, 320, and 330 for outputting a warning or correcting the driving state of the vehicle under the control of the controller 200.

Depending on the type and mounting position thereof, the information acquisition devices may include: a proximity sensor 110, which senses obstacles within a predetermined sensing range in the vicinity of the vehicle; an in-wheel motor 120, which is disposed in the wheel; a steering system 130, which determines a steering angle; and a transmission 140, which determines information about the current gear stage and the speed of the output side.

The proximity sensor 110 may be implemented as an ultrasonic sensor. However, this is given merely by way of example, and the embodiments are not limited thereto. The embodiments are not limited to any specific type of proximity sensor, so long as the sensor is capable of sensing obstacles within a predetermined range.

The in-wheel motor 120 may provide power to the wheel in which the in-wheel motor 120 is mounted and may also precisely control and measure the rotation of the corresponding wheel regardless of output of the power.

The steering system 130 may be implemented as an electronic power steering (EPS) system or a mechanical steering system (e.g. rack & pinion mechanism). However, the embodiments are not limited to any specific type of steering system, so long as the system is capable of acquiring information about the steering angle.

The transmission 140 may be implemented as an automatic transmission (AT), a manual transmission (MT), a continuously variable transmission (CVT), or a dual clutch transmission (DCT). However, the embodiments are not limited to any specific type of transmission, so long as the transmission is capable of acquiring information about the travel direction of the vehicle, i.e. whether the current gear stage is the D-range or the R-range. Also, in the case of a vehicle that is not equipped with a mechanical transmission system, like an electric vehicle (EV), a device capable of acquiring and outputting information about the travel direction of the vehicle in response to operation of a shifting lever or a shifting button can be considered a transmission according to the embodiment.

The controller 200 may include an obstacle recognition and tracking unit 210, a travel range determination unit 220, an effective obstacle determination and warning unit 230, and a driving correction unit 240.

The obstacle recognition and tracking unit 210 may determine the distance from the vehicle to the obstacle and the heading of the obstacle based on the obstacle sensing information provided from the proximity sensor 110. In addition, the obstacle recognition and tracking unit 210 may set a previously sensed obstacle as an obstacle to be tracked when the previously sensed obstacle deviates from the sensing region of the proximity sensor 110 as the vehicle moves. The obstacle recognition and tracking unit 210 may also cumulatively track the relative position of the obstacle based on the wheel speed information acquired by the in-wheel motor 120 and the steering angle information acquired by the steering system 130. However, the obstacle recognition and tracking unit 210 may stop tracking the obstacle when the obstacle comes to be spaced at a predetermined distance or more apart from the vehicle. In addition, the obstacle recognition and tracking unit 210 may determine an obstacle, to which the sensing distance from the proximity sensor 110 varies when the vehicle is stopped, to be a moving object, and thus may not set the same as an obstacle to be tracked. In addition, the obstacle recognition and tracking unit 210 may also determine a trigger condition for performing the above-described recognition and tracking of an obstacle. For example, when it is recognized that the vehicle is traveling at a low speed or is in a parked state, it may be determined that the trigger condition is satisfied. Specifically, the trigger condition may be determined to be satisfied at the time of gear shifting to the R-range, manipulation of a parking switch by a driver (activation of a smart parking assist system (SPAS)), activation of an around view monitor, low-speed traveling after manipulation of a separate switch provided for a corresponding function, determination of entry into a parking lot or a driver's garage based on information from a navigation system, or recognition of an obstacle, such as a parking spot, a parking line, and a pillar, using an image acquired by a camera. However, the embodiments are not limited thereto.

The travel range determination unit 220 may predict the travel direction of the vehicle based on the current gear stage (D or R), which determines forward or backward movement of the vehicle, and the steering angle. The travel range determination unit 220 may also determine the travel range of the vehicle based thereon.

The effective obstacle determination and warning unit 230 may determine an effective obstacle, a warning about which is to be output, based on whether at least one of an obstacle that is currently being sensed or an obstacle that is currently being tracked by the obstacle recognition and tracking unit 210 is present within the travel range determined by the travel range determination unit 220. The effective obstacle determination and warning unit 230 may also determine to output a warning about the determined effective obstacle.

The driving correction unit 240 may compare, based on the wheel speed information on each drive wheel acquired by the in-wheel motor 120 and the steering angle information acquired by the steering system 130, a predicted travel trajectory according to the steering angle information with the actual travel trajectory according to the wheel speed information. The driving correction unit 240 may also determine to perform correction control when there is a difference therebetween. For example, in the case in which the turning radius of the actual travel trajectory is larger than that of the predicted travel trajectory (in the case of understeer), the driving correction unit 240 may increase the torque of the in-wheel motor disposed outside the turning radius or may reduce the torque of the in-wheel motor disposed inside the turning radius. On the other hand, in the case in which the turning radius of the actual travel trajectory is smaller than that of the predicted travel trajectory (in the case of oversteer), the driving correction unit 240 may increase the torque of the in-wheel motor disposed inside the turning radius or may reduce the torque of the in-wheel motor disposed outside the turning radius.

The controlled devices may include a display 310, a speaker 320, and a motor controller 330.

The display 310 may visually output a warning indicating the position of an obstacle under the control of the effective obstacle determination and warning unit 230. The speaker 320 may output a warning sound or warning voice under the control of the effective obstacle determination and warning unit 230. At this time, the visual warning or the warning sound may be output in different forms depending on the number of effective obstacles, the heading of the effective obstacle, and the distance to the effective obstacle. However, the embodiments are not limited thereto.

The motor controller 330 may control the in-wheel motor 120 in response to a correction control command from the driving correction unit 240.

Hereinafter, an obstacle avoidance assist process is described with reference to FIG. 4 based on the configuration of the apparatus described above.

Figure 4:
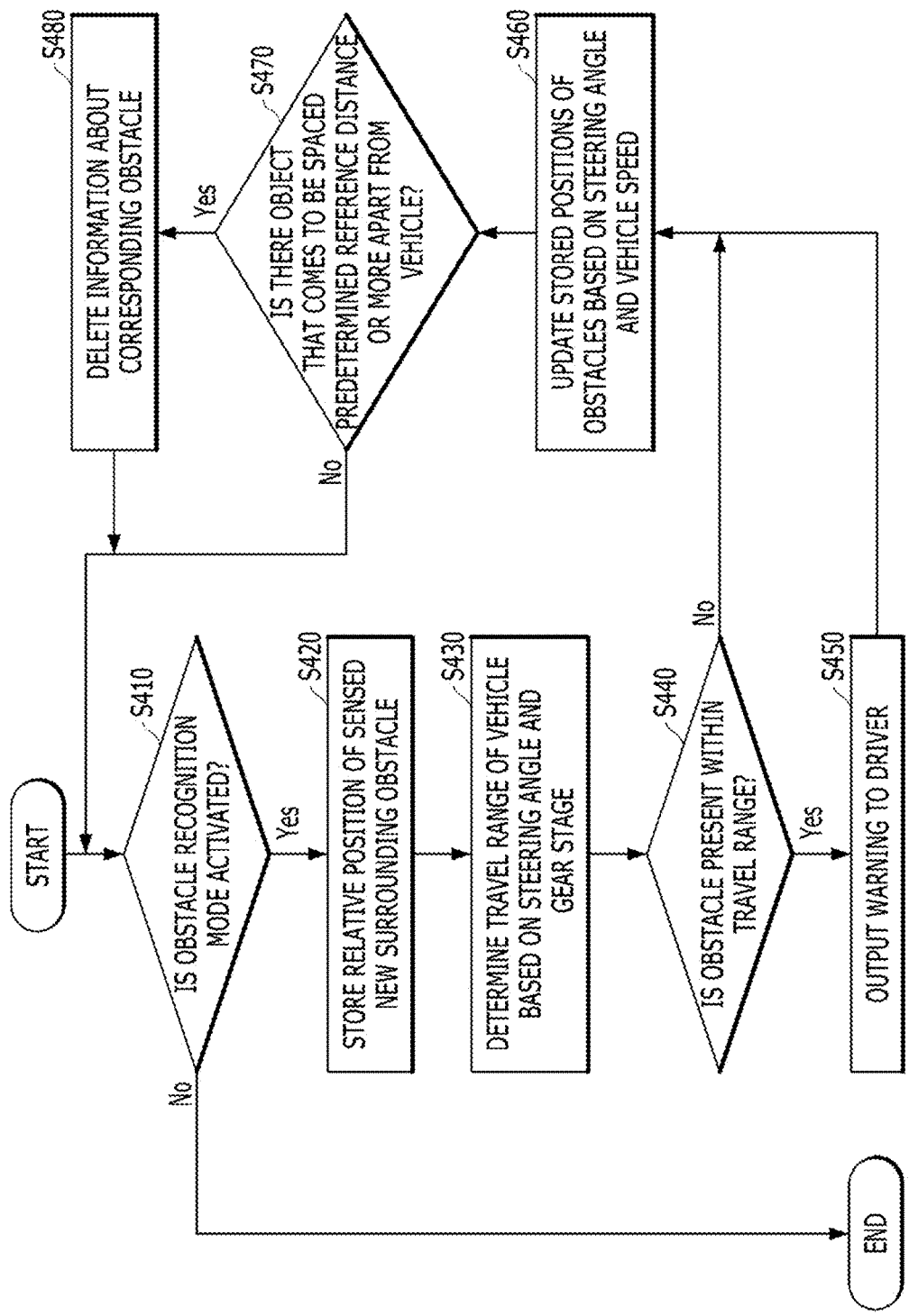
FIG. 4 is a flowchart of an example of an obstacle avoidance assist process according to an embodiment of the present disclosure.

FIG. 4 is a flowchart of an example of an obstacle avoidance assist process according to an embodiment of the present disclosure.

Referring to FIG. 4, the controller 200 may determine whether an obstacle recognition mode is activated (S410). As described above, whether the obstacle recognition mode is activated may be determined depending on the trigger condition, for example, whether the vehicle is traveling at a low speed or whether the vehicle is in a parked state.

When the obstacle recognition mode is activated (Yes in S410), the controller 200 may store therein the relative position of a new surrounding obstacle (i.e. an obstacle that is currently being sensed) based on the information acquired from the proximity sensor 110 (S420) and may determine the travel range of the vehicle based on the steering angle and the gear stage (S430).

When an effective obstacle is present within the travel range (Yes in S440), the controller 200 may output a warning about the obstacle in order to announce the presence of the obstacle to a driver (S450) and may cumulatively update the stored positions of the obstacles based on the steering angle and the vehicle speed (wheel speed) (S460).

When any one of the obstacles to be tracked comes to be spaced at a predetermined reference distance or more apart from the vehicle (Yes in S470), information about the corresponding obstacle may be deleted (S480).

On the other hand, in the step of deleting the information about the obstacle (S480), when the number of outputs of a warning about any one of the obstacles to be tracked reaches a predetermined number, as an alternative to the reference distance, information about the corresponding obstacle may be deleted. Further, the controller 200 may activate an active brake assist function depending on the distance to an effective obstacle. Also, when an effective obstacle is an obstacle to be tracked, the controller 200 may prevent activation of an active brake assist function.

Furthermore, when an obstacle to be tracked or a currently sensed obstacle is not an effective obstacle, a warning output mode for the same may be different from that for an effective obstacle. For example, both a visual warning and an audible warning may be output for an effective obstacle, and only a visual warning may be output when the corresponding obstacle is not an effective obstacle.

The present disclosure, and aspects thereof such as the controller, may include a processor and may be implemented with or as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), Read-Only Memory (ROM), Random Access Memory (RAM), Compact Disk ROM (CD-ROM), a magnetic tape, a floppy disc, and an optical data storage.

As is apparent from the above description, according to a vehicle and an obstacle avoidance assist method thereof associated with at least one embodiment of the present disclosure, configured as described above, information about surrounding obstacles may be more effectively provided to a driver.

In particular, it is possible to output a warning about an effective obstacle, which is present within a travel range of a vehicle, among at least one obstacle to be tracked and at least one currently sensed obstacle. The warning is determined in consideration of the gear stage and the steering angle of the vehicle. Thus, the vehicle and the obstacle avoidance assist method thereof may enable more effective obstacle avoidance assistance.

However, the effects achievable through the present disclosure are not limited to the above-mentioned effects. Other effects not mentioned herein should be clearly understood by those having ordinary skill in the art from the above description.

It should be apparent to those having ordinary skill in the art that various changes in form and details may be made without departing from the spirit and essential characteristics of the present disclosure set forth herein. Accordingly, the above detailed description is not intended to be construed to limit the present disclosure in all aspects and should be considered by way of example. The scope of the present disclosure should be determined by reasonable interpretation of the appended claims and all equivalent modifications made without departing from the present disclosure should be included in the following claims.

What is claimed is:

1. An obstacle avoidance assist method, comprising:
   detecting by a proximity sensor at least one obstacle around a vehicle using a proximity sensor;
   determining by a controller a travel range corresponding to a predicted travel trajectory of a body of the vehicle based on a gear stage and a steering angle;
   determining by the controller at least one effective obstacle, based on the travel range, from the at least one detected obstacle;
   outputting by an output unit a warning about the determined at least one effective obstacle;
   determining by the controller a predicted travel trajectory based on the steering angle;
   determining by the controller an actual travel trajectory based on the steering angle and a wheel speed of a predetermined drive wheel; and
   correcting by the controller a difference between the predicted travel trajectory and the actual travel trajectory.

2. The obstacle avoidance assist method according to claim 1, wherein the at least one detected obstacle comprises at least one of a first obstacle that is currently being sensed by the proximity sensor or a second obstacle, wherein a relative position of the second obstacle is tracked after being sensed by the proximity sensor.

3. The obstacle avoidance assist method according to claim 2, wherein the relative position of the second obstacle with respect to movement of the vehicle is cumulatively tracked based on a wheel speed and the steering angle.

4. The obstacle avoidance assist method according to claim 2, wherein tracking an obstacle corresponding to the second obstacle, of the at least one detected obstacle, is stopped when a predetermined condition is satisfied.

5. The obstacle avoidance assist method according to claim 4, wherein the predetermined condition is determined to be satisfied in at least one of a case in which the obstacle comes to be spaced at a predetermined distance or more apart from the body of the vehicle, a case in which the obstacle is determined to be a moving object, or a case in which a number of outputs of a warning becomes equal to or greater than a predetermined number during tracking.

6. The obstacle avoidance assist method according to claim 2, wherein the outputting comprises:
   outputting different types of warning for the first obstacle and the second obstacle.

7. The obstacle avoidance assist method according to claim 1, wherein the determining at least one effective obstacle comprises:
   determining, when at least a portion of an obstacle of the at least one detected obstacle is located within the travel range, the obstacle to be the effective obstacle.

8. The obstacle avoidance assist method according to claim 1, wherein the predetermined drive wheel comprises a drive wheel equipped with an in-wheel motor, wherein the wheel speed is measured by the in-wheel motor, and wherein the correcting is performed through selective control of a torque of the in-wheel motor.

9. A non-transitory computer-readable recording medium storing a program configured to execute the obstacle avoidance assist method according to claim 1.

10. A vehicle comprising:
    a proximity sensor;
    a controller configured to detect at least one obstacle around a vehicle based on information acquired by the proximity sensor and to determine whether to output a warning; and
    an output unit configured to output a warning under control of the controller,
    wherein the controller
      determines a travel range corresponding to a predicted travel trajectory of a body of the vehicle based on a gear stage and a steering angle,
      determines at least one effective obstacle, based on the travel range, from the at least one detected obstacle,
      controls the output unit to output a warning about the determined at least one effective obstacle,
      determines a predicted travel trajectory based on the steering angle,
      determines an actual travel trajectory based on the steering angle and a wheel speed of a predetermined drive wheel, and
      corrects a difference between the predicted travel trajectory and the actual travel trajectory.

11. The vehicle according to claim 10, wherein the at least one detected obstacle comprises at least one of a first obstacle that is currently being sensed by the proximity sensor or a second obstacle, and wherein a relative position of the second obstacle is tracked after being sensed by the proximity sensor.

12. The vehicle according to claim 11, wherein the controller cumulatively tracks the relative position of the second obstacle with respect to movement of the vehicle based on a wheel speed and the steering angle.

13. The vehicle according to claim 11, wherein the controller stops tracking an obstacle corresponding to the second obstacle, of the at least one detected obstacle, when a predetermined condition is satisfied.

14. The vehicle according to claim 13, wherein the predetermined condition is determined to be satisfied in at least one of a case in which the obstacle comes to be spaced at a predetermined distance or more apart from the body of the vehicle, a case in which the obstacle is determined to be a moving object, or a case in which a number of outputs of a warning becomes equal to or greater than a predetermined number during tracking.

15. The vehicle according to claim 11, wherein the controller performs control such that different types of warning are output for the first obstacle and the second obstacle.

16. The vehicle according to claim 10, wherein, when at least a portion of an obstacle of the at least one detected obstacle is located within the travel range, the controller determines the obstacle to be the effective obstacle.

17. The vehicle according to claim 10, wherein the controller determines a predicted travel trajectory based on the steering angle, determines an actual travel trajectory based on the steering angle and a wheel speed of a predetermined drive wheel, and corrects a difference between the predicted travel trajectory and the actual travel trajectory.

18. The vehicle according to claim 17, wherein the predetermined drive wheel comprises a drive wheel equipped with an in-wheel motor, wherein the wheel speed is measured by the in-wheel motor, and wherein the controller performs correction through selective control of a torque of the in-wheel motor.

\* \* \* \* \*